United States Patent Office 3,838,038
Patented Sept. 24, 1974

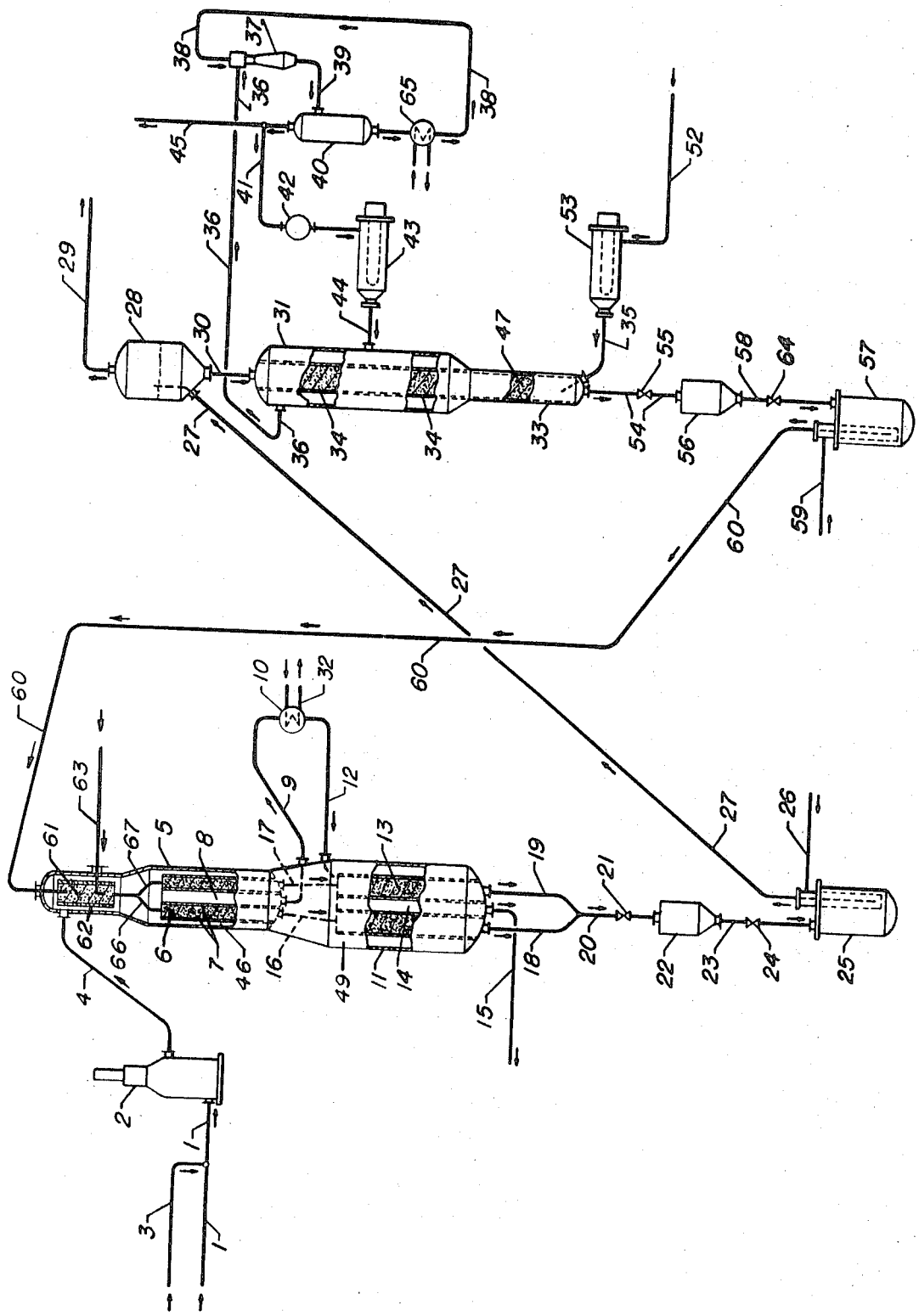

3,838,038
CONTINUOUS CONVERSION AND REGENERATION PROCESS
Arthur R. Greenwood, Niles, and Kenneth D. Vesely, Arlington Heights, Ill., assignors to Universal Oil Products Company, Des Plaines, Ill.
Continuation-in-part of application Ser. No. 207,869, Dec. 14, 1971, now Patent No. 3,725,249, which is a continuation-in-part of application Ser. No. 860,905, Sept. 25, 1969, now Patent No. 3,647,680. This application Sept. 28, 1972, Ser. No. 293,251
The portion of the term of the patent subsequent to Apr. 3, 1990, has been disclaimed
Int. Cl. C10g 13/02
U.S. Cl. 208—108  16 Claims

ABSTRACT OF THE DISCLOSURE

A method of operating a continuous hydrocarbon process employing catalyst particles wherein catalyst activity is maintained at a predetermined level by continuous regeneration thereof without removal of any reactor from the processing streams. The method includes continuous reduction and sulfiding of the catalyst prior to contact with a reactant stream in one or more reactors in which a continuous or reasonably continuous input and output of catalyst is regulated. The sulfiding and reduction steps take place in an upper portion of a reaction zone so that those steps occur prior to catalyst being contacted with a reactant processing stream. The regeneration of the catalyst is continuous and includes a carbon burn-off and reduction and sulfiding step which allow the catalyst to be passed back into the reactor system thereby maintaining controlled catalyst activity within the reactor.

CROSS-REFERENCE TO RELATED APPLICATION

This application is a continuation-in-part application of our copending application S.N. 207,869 filed Dec. 14, 1971 now U.S. Pat. 3,275,249. That application is a continuation-in-part application of S.N. 860,905 filed Sept. 25, 1969, and now issued as U.S. Pat. 3,647,680 on Mar. 7, 1972.

BACKGROUND OF THE INVENTION

Field of the Invention

The field of art to which this invention pertains is hydrocarbon processing in conjunction with continuous regeneration. Specifically, the pertinent art to which this invention will relate will be found in areas in which combinations of continuous regeneration and continuous hydrocarbon processing processes are disclosed.

Description of the Prior Art

The closest known prior art would be in patents or publications similar to U.S. Pat. 3,647,680 issued Mar. 7, 1972, having A. R. Greenwood and K. D. Vesely, the inventors herein, as patentees. Foreign counterparts are Belgium Pat. 764,747, published Mar. 24, 1971, and Greek Pat. 41,755, published Sept. 23, 1970.

Specifically, that invention relates to a continuous reforming regeneration process utilizing a moving bed of a reforming catalyst and a regeneration zone which also continuously regenerates the catalyst in a sequence as follows: The spent catalyst is regenerated by passing through a burn-off step, a halogenation zone, and a drying zone followed by reduction of the catalyst particles prior to passage into continuous reforming reaction zone. Specifically, that patent discloses processes utilizing platinum containing reforming catalysts.

That regeneration sequence includes such needed operation as halogenation and drying of a regenerated catalyst, steps which are unnecessary in most other processes such as isomerization, hydrocracking, hydrorefining hydrotreating, methane, rich gas production, solid bed alkylation, solid bed catalytic cracking, etc. Our invention utilizes in combination with a continuous hydrocarbon conversion zone, a continuous regeneration processing sequence including the basic steps of oxygen burn-off followed by reduction and sulfiding of a catalyst. In many processes including reforming, it is desired to pass the catalyst into the process in a slightly reduced state of activity to prevent initial high activity and inefficient reactions from occurring. Namely, in a specific example in hydrocracking, it is desired to eliminate or temper the catalyst of its high initial activity by reducing and sulfiding some of the metals present on the catalyst in order to reduce high yields of low quality products which initially are produced when a high activity freshly regenerated catalyst is contacted. Essentially the same or similar problems can occur in hydrorefining or hydrotreating processes in which a freshly reactivated catalyst is utilized. In order to overcome this, the sulfiding step was deemed to be necessary.

BRIEF SUMMARY OF THE INVENTION

Our invention can be briefly summarized as a method for operating a continuous conversion process employing catalyst particles. The process utilizes a moving bed reaction zone and a continuous regeneration zone which causes the burning of carbonaceous material off of a catalyst which has been withdrawn from the reaction zone. The catalyst which now has a reduced carbonaceous level upon it is passed into the vicinity of the reaction zone to be reduced and sulfided prior to contact with feed stock in a dense-phase bed of catalyst particles in the reaction zone.

A broad embodiment of our invention resides in a method of operating a continuous process employing solid catalyst particles which process comprises (a) charging a reaction mixture to a reactor and contacting said reaction mixture with a dense-phase moving bed of catalyst particles at conversion conditions; (b) withdrawing used particles from said reactor while maintaining the same on stream at conversion conditions; (c) treating the used catalyst particles with an oxygen-containing gas to burn at least a portion of the carbonaceous material therefrom; (d) charging the catalyst particles together with hydrogen to a top portion of said reactor and processing the catalyst particle downwardly as a dense-phase moving bed in contact with said hydrogen through a confined reducing zone in the upper portion of said reactor to effect reduction of said particles at temperatures greater than about 300° F.; (e) processing the reduced catalyst particles downwardly as a dense-phase moving bed in contact with said hydrogen to a confined sulfiding zone in open communication with the said reducing zone, continuously introducing and comingling a sulfiding agent with catalyst particles and hydrogen in said sulfiding zone at conditions to effect the sulfiding of desired metals upon the catalyst; (f) the resulting reduced and sulfided particles being processed downwardly from said sulfiding zone together with products of reduction and sulfiding, unreacted hydrogen and sulfiding agent into a dense-phase bed of catalyst particles maintaining within the reaction zone.

BRIEF DESCRIPTION OF THE DRAWING

The attached drawings show a preferred embodiment of the process of our invention and is not to be used to unduly limit the scope of the appended claims.

A hydrocarbon reactant mixture passes through line 1 through optional heater 2 which is utilized depending upon the type of conversion process utilized within the reaction zones. Optional hydrogen gaseous stream 3 is comingled with the reactant stream and may or may not be used depending upon the type of processing which is used in the conversion process. Preheated feed stock, if utilized, passes through line 4 and preferably into volume 62 which surrounds catalyst dense-phase bed 61. The space 62 which surrounds what will hereinafter be defined as the reducing and sulfiding zones, allows an indirect heat exchange of feed stock with catalyst and hydrocarbon materials present within the catalyst within those zones in order to maintain catalyst temperature at a sufficiently high level in order to induce the reducing and sulfiding reactions. Optionally line 4 may be connected directly to reactor 5 passing into the outer volume 46 surrounding the annular catalyst bed 6 within that reaction zone. In instances in which feed stock, whether or not preheated, passes directly into the reactor 5 the sulfiding and reducing zones may themselves be preheated by a preheater surrounding the confined zones or by substantial preheat of input streams passing through sulfiding and reducing zones. It is preferred in certain instances to preheat hydrogen gases which may pass into the reducing zone and the sulfiding agent which passes into the sulfiding zone.

In either case, feed stock passes into the outer volume 46 through inner and outer screens labeled 7 and through dense-phase bed of catalyst 6 maintained within the screens and into the center portion of the radial flow reaction zone volume 8. Volume 8 is connected to outlet line 9 which can carry the hydrocarbon effluent from dense bed 6 through heat exchanger 10 through line 12 and back into the outer volume 49 of reaction zone 11. Heat exchanger 10 may be utilized to add heat via heating medium passing trough line 32 to the material passing between stages or may be utilized to cool or quench the reaction taking place within the reaction zones. Whether heat exchanger 10 is used to heat or cool streams passing between reaction zones depends on the type of conversion process utilized in the process of our invention.

The heated or cooled effluent material passing through line 12 is eventually dumped into outer volume 49 of reactor 11. The hydrocarbon material passes into the radial flow reactor bed through the screens containing the bed through dense-phase bed of catalyst 13 and into the core 14 of the radial flow reactor to be recovered and removed from reactor 11 via effluent line 15. The material recovered from line 15 may be cooled or sent to other processing apparatus or may instead be passed to another series of reaction zones similar to those described above.

In the meantime while the feed and effluent flow is carried out as described above, the catalyst is generally continuously being added to and withdrawn from reactors 5 and 11. The constant addition and withdrawal shall be defined in this specification as either intermittent addition or withdrawal or continuous addition or withdrawal. The main concern in using the term "continuous addition" or "withdrawal" is that over an average period of time there is a given amount of catalyst recovered and supplied to the reactors. This allows essentially a constant activity to be maintained without upsetting the process or requiring shut down or switching of a reaction zone as is commonly done in other types of processes. The term "moving bed" shall be synonymous with constant addition and withdrawal of catalyst .

The catalyst particles descend through reactor 5 as an annular moving bed 6 and continue through the annular moving bed 13 of reactor 11 by way of catalyst transfer conduits 16 and 17. Conduits 16 and 17 represent a multitude of catalyst transfer conduits permitting passage of the catalyst between the annular beds 6 and 13 and effecting a suitable pressure drop whereby substantially all of the reactant stream from reactor 5 is directed through center portion 8 of that reaction zone and out of that section of the reactor via line 9. This is done to reduce or minimize the amount of effluent bypassing heat exchanger 10 via catalyst carrying conduits 16 and 17. When viewing the system in an overall manner, it can be seen that the system has a common catalyst bed moving as a substantially unbroken column of particles through the top reactor and the bottom reactors 5 and 11 respectively. The top and bottom reactors can be described as annular beds allowing flow of reactant mixtures from an outer volume through the catalyst, through the inner portion or center of the annular space formed by the catalyst out of that space to either be passed to a heat exchanger or withdrawn from the system. The reactor may be a single annular column of catalyst without interstage processing or it may be a cylindrical column of catalyst.

In instances in which two phase flow occurs in the reactor, the radial flow design is not ideally suited because the liquid feed may pass down through the radial bed of catalyst instead of generally passing horizontally through the catalyst bed. In such cases a solid cylindrical bed of catalyst is preferred. However, if interstage cooling or heating is required, it may be necessary to design liquid collection means at the lower portion of each reactor section. The liquid collection means would function to both collect liquid to be heated or cooled and collect and pass catalyst to the next reaction section.

The bottom terminal reactor 11 allows the intermittent withdrawal of catalyst through catalyst withdrawal lines 18 and 19 which are combined into catalyst withdrawal line 20. Line 20 contains a control valve which allows, at a predetermined signal received by it, a quanity of catalyst passed through line 20 and into lock hopper 22 wherein residual hydrocarbons can be separated from the catalyst. The used catalyst is subsequently transferred through line 23 and control valve 24 to a lift engager 25 to be lifted by a gaseous stream and into a disengaging hopper 28 by way of line 27. The gaseous material used as lift gas may include hydrogen, nitrogen, oxygen or other gaseous material. The catalyst is lifted to hopper 28 by flow of the lift gas charged to the lift engager through line 26 from an external source not shown. The lift gas charged to the lift engager 25 is regulated at a rate in order to substantially exceed the terminal settling velocity of the catalyst particle desired to be transferred through line 27.

The used catalyst deposited in the disengaging hopper 28 carries various quantities of sulfur, nitrogen, and carbonaceous materials. An overhead line 29 is provided to vent the disengaging hopper 28 to the atmosphere or to recycle the gaseous material through that line to the lift engager or for other process use. Catalyst particles from the disengaging hopper 28 are fed through line 30 to a catalyst regenerator comprising the carbon burn-off zone 31. The catalyst particles are processed downwardly as a moving bed or column 34.

In the carbon burn-off zone 31, the catalyst particles are heated and contacted with an oxygen-containing gas including optional hot recycle gases charged to the carbon burn-off zone by way of line 44. The oxygen-containing gas may be derived from air and is charged to the bottom section 33 of the carbon burn-off zone by way of line 35. The air is preheated if necessary by preheater 53 which heats the relatively pure air or oxygen stream to a temperature sufficient to maintain oxidation of the carbonaceous materials within the carbon burn-off zone. It is preferred to pass air or high concentration oxygen-containing gas streams into the lower portion of the carbon burn-off zone in an area of the zone in which the catalyst contains a relatively low quantity of carbonaceous material in order to prevent the occurance of high temperature localized hot spots from the uncontrolled oxidation of carbonaceous material by the relatively large quantity of oxygen present in air. The resulting gaseous products in the bottom portion of the carbon burn-off zone 31 in bed 33 pass in an upward direction and are eventually comingled with recycle gas streams passing through line 44.

Regenerated gas streams which contain substantial quantities of carbon dioxide and carbon monoxide along with oxides of other contaminant materials are recovered from the regenerator via line 36 and may be contacted with caustic material passing from caustic settler 40 via line 38 which may be cooled or heated by heat exchanger 65. The caustic material passes into the scrubber 37 to contact the flue gas. The resultant mixture passes through line 39 into the caustic settler 40. A portion of the scrubbed flue gas material may be vented to the atmosphere via line 45. Another portion may be recovered via line 41 compressed by a compressor or blower 42 and preheated via heater 43 and passed via line 44 into the carbon burn-off section. It is contemplated that the ratio of recycle gas to the quantity of fresh air or oxygen passed into the system via lines 44 and 52 may be regulated by suitable instrumentation to maintain relatively low concentrations of oxygen in the upper portion of the burn-off zone where the high quantities of carbonaceous materials are present upon the spent catalyst passing into that section. The preferred oxygen concentration in the upper section is from about 0.5 to about 2 vol. percent. Other concentration ranges may be utilized in the upper and lower sections of the regeneration zone where carbon levels and/or regeneration temperatures are fairly low.

The lower portion of the regenerator represented by the bed 47 may also effect the drying of catalyst particles prior to their passage out of the system. In instances in which water would be present on the freshly burned catalyst, the air can be heated to a sufficiently high temperature so that in addition to removing the last quantities of carbonaceous materials or other contaminants present upon the catalyst, it can also remove excess moisture from the catalyst.

Essentially freshly regenerated catalyst is removed from the regeneration zone via line 54 which contains a valve 55 which can regulate the rate or withdrawal of catalyst from the bottom portion of the regenerator. Catalyst is collected in lock hopper 56 where various operations may take place including the purging of oxygen materials from the void spaces between the particles or contacting or prewetting the catalyst with a hydrocarbon stream. After essentially most of the oxygen materials have been removed in the lock hopper 56, the catalyst can be withdrawn from the lock hopper via line 58 at a rate controlled by valve 64. The catalyst particles then pass into a second lift engager 57 which preferably utilizes a stream of hydrogen or inert gas passing through line 59 to carry catalyst from the lift engager 57 via line 60 into the upper portion of bed 61 within the reaction zone. Preferably, the lift gas is hydrogen and it can effect subsequent reduction of catalyst in the confined reduction zone.

Preferably and prior to direct contact with reactant stream in upper portion of dense bed 6 in reactor 5, the catalyst is admixed with hydrogen in a dense bed through a reducing zone 61 to effect the reduction of the oxides in the catalyst and the production of water. The hydrogen may be preheated to maintain temperature in the reaction zone or the dense bed 61 within the confined reduction sulfiding zones may itself be directly or indirectly heat exchanged with, among other things, preheated feed materials or through the use of external heat exchangers. The catalyst is processed on the downward direction from confined dense bed 61 eventually passing through lines 66 and 67 into the dense bed 6 within reactor 5.

Below dense bed 61 is what we refer to as the sulfiding zone which is in direct communication with bed 61. In this zone a sulfiding agent is passed into the sulfiding zone through line 63 at conditions to effect sulfiding of the already reduced catalyst. Preferably, the sulfiding occurs on certain preselected metal components present within the catalyst utilized. The sulfiding agent may be hydrogen sulfide or it may be hydrogen sulfide dissolved or diluted in a hydrocarbon or gaseous material or may be a sulfur compound in a diluted light or medium light hydrocarbon liquid phase.

Specifically, the two reactions taking place within dense beds 61 and the sulfiding zone as mentioned above are the reduction and the sulfiding steps. The sulfiding agent may be preheated but in other instances in which either a direct or indirect heat exchange takes place between bed 61 and the sulfiding zone and feed stock, both the reduction and sulfiding zones within the dense bed are maintained at a temperature suitable to enhance the reduction and sulfiding reactions and preheating of the sulfiding agent or hydrogen passing into these zones is not necessary.

The catalyst particles together with hydrogen and unreacted sulfiding agent, the products of reduction and sulfiding and the catalyst pass through lines 66 and 67 into the upper portion of dense bed 6 within reactor 5. The catalyst at this point preferably is first contacted with the reactant feed mixture and is now at a suitable state of reduction and sulfiding and preferably also at a suitable temperature level to enhance the preferred reaction desired for the conversion process.

DETAILED DESCRIPTION OF THE INVENTION

Our process can be referred to as generally a combination process in which a moving bed of catalyst is maintained in a reaction zone with the activity on the catalyst maintained at some given level by the addition and withdrawal of catalyst from the reaction zone, in a programmed manner, in combination with a continuous regeneration apparatus, preferably a moving bed apparatus which allows carbon burn-off of carbonaceous materials present upon a catalyst and a zone for reducing and sulfiding to prepare the catalyst for reuse in the process.

Our process is generally applicable to any type of hydrocarbon conversion process and includes such general processing as hydroprocessing which includes hydrocracking, hydrotreating and hydrorefining; reforming; isomerization; alkylation; dehydrogenation; cracking; and shift gas reaction processes, etc. The conversion process as used in the claims can include all of the above and any other conversion process primarily directed towards hydrocarbon conversion in which a carbonaceous material is laid upon a catalyst rendering it less active than freshly prepared and activated catalyst. In addition to those hydrocarbon conversion processes in which carbonaceous materials are laid upon a catalyst, conversion processing also includes those processes in which an addition to the coke laid out there is an appreciable quantity of metals laid upon the catalyst because of their presence in the feed stock. The production and contamination of the catalyst with nitrogen and/or sulfur compounds which originally are present upon the catalyst is also contemplated. It can then be seen that the term "conversion process" as utilized in the claims can include any type of process in which the catalyst is substantially deactivated by the lay down of contaminant materials upon the catalyst. The combination process of this invention which in addition to the hydrocarbon conversion, includes a carbon burn-off step, subsequent reduction and sulfiding of the regenerated catalyst and is applicable to those processes in which a catalyst after being freshly regenerated by contacting with air or oxygen to substantially remove contaminants from the catalyst requires that the catalyst be subsequently reduced and sulfided to slightly temper its activity. This tempering substantially, if not totally, reduces the initial high activity present if the catalyst is not sulfided thereby preventing unnecessarily high rates of degradation in yields.

Many processes utilize catalyst which contain metals which must be sulfided in order to temper the activity of the catalyst to prevent runaways or low quality yields or high coking rates upon the catalyst. Specifically, such processes which typically require sulfiding are reforming and the hydroprocessing processes, although other processes may be utilized which initial catalyst activity is desired to be substantially tempered by a sulfiding step. Even other processes utilize a metal sulfide as a catalytic promoter, which is produced by the sulfiding step of our invention.

Our process is especially applicable to the hydroprocessing operations. Hydroprocessing, when used as a generic term, shall include the terms defined as hydrotreating, hydrocracking, and hydrorefining. A specific explanation of the term "hydroprocessing" along with the use of the other three species of generic term can be found in article presented by D. H. Stormont, entitled "Here's a Nomenclature-System Proposal for Hydroprocessing" presented in the *Oil and Gas Journal,* Oct. 7, 1968, pages 174 and 175. A specific definition of the individual species of hydroprocessing is included in this article and specific reference of this article is made into this specification. Hydrocracking involves a substantial reduction in the molecular size (40% or more) of the charge with hydrogen consumptions in the range of about 1000 to about 3000 s.c.f./bbl. of feed. Hydrorefining or hydropurification involves molecular changes of a minor segment of the feed (10% or less) with hydrogen consumption in a range of from about 100 to about 1000 s.c.f./bbl. Some cracking may occur but it is not the primary objective. The most severe operation typically referred to as hydrocracking from the feed molecule standpoint involves a reduction in molecular size of a substantial part (50% or more) of the charge with hydrogen consumption in the range of about 1000 to about 3000 s.c.f./bbl. Hydrotreating involves essentially no reduction in molecular size and relatively little rearrangement of molecules with hydrogen consumption of less than about 100 s.c.f./bbl. with the objective to remove small amounts of several types of impurities from the feed stock.

Hydrocracking, sometimes referred to as the destructive hydrogenation, involves the cracking of hydrocarbonaceous materials in the presence of hydrogen and a suitable catalytic composite effects the molecular change in the structures of hydrocarbonaceous material. It is always done in the presence of hydrogen. Typically, it is used for the conversion of a wide variety of coals, tars, petroleum crude oils, heavy residual oils, heavy vacuum gas oils, etc., having as the objective the production of lower boiling saturated products and, to a certain extent, intermediates which are suitable for utilization as domestic fuels and heavier gas oil fractions which find utilization as suitable lubricants are also produced. Specific operating conditions within the process include the presence of hydrogen in amount of range of from about 1000 to about 10,000 s.c.f./bbl. of feed stock and preferably from about 3000 to about 8000 s.c.f./bbl. of feed stock. The material passed into the hydrocracking zone is typically preheated within a range of from about 500 to about 800° F. maximum with the catalyst temperature within the hydrocracking zone preferably maintained at a temperature within the range of from about 600 to about 950° F., with the pressure being maintained from anywhere from about 300 p.s.i.g. to about 3000 p.s.i.g.

The hydrocracking catalyst carrier material comprises typically at least two refractory inorganic oxides, preferably alumina and silica and can be prepared by separate, successive or co-precipitation methods. The catalytic active metal component and/or components of the catalyst disposed within the hydrocracking catalyst is composited with the aforementioned acid-acting material. The metallic components are generally employed in the amount of from about 1/10 to about 20 wt. percent of the total of catalyst. The catalyst comprises at least one metallic component selected from the metals of the groups 6A and 8 of the Periodic Table and includes therefore platinum, palladium, nickel, iron and cobalt, molybdenum, tungsten, chromium, ruthenium, rhodium, iridium, etc. These materials may be incorporated with the acid-acting cracking carrier material in any suitable manner.

Hydrorefining or hydropurification typically is performed on what the art refers to as "black oils." Petroleum crude oils, in particular the heavy residuals extracted from tar sands, topped or reduced crudes and vacuum residue contain high molecular weight sulfur compounds in exceedingly large quantities, nitrogen compounds, high molecular weight organo-metallic complexes principally among nickel and vanadium as the metal component and heptane insoluble asphalt material. Typically, in the hydrorefining reaction some of the feed stock may be cracked to smaller materials and in fact a large quantity of it may be cracked if a two-stage hydrorefining hydrocracking operation is utilized. However, for the purposes of our definition we shall presume that a minor portion of the feed stock is reduced in molecular size but a large portion of the metals, sulfur and nitrogen contaminant materials are removed from the feed stock by reaction into materials easily separated from the feed stock or effluent or deposition upon the catalytic composite within the processing step. Typically, the reaction conditions include hydrogen concentrations of less than about 4000 s.c.f./bbl. of total liquid feed and preferably anywhere from about 500 to about 2500 s.c.f./bbl. of hydrogen per barrel of feed. Typically, the catalyst temperatures are anywhere from about 650 to about 900° F. within an imposed pressure within the range of from about 1000 to about 3000 p.s.i.g.

Catalyst which can be used in the hydrorefining or hydroprocessing reaction zone include a metal component having hydrogenation activity which component is composited with a refractory inorganic oxide carrier material of either synthetic or natural origin. The precise composition or method of manufacture of the carrier is not considered essential to the present invention although carriers such as alumina and/or silica are generally preferred. Metals to be placed upon the carrier include hydrogenation activity materials selected from the group consisting of the 6B and 8 of the Periodic Table. One or more components may be present upon the catalyst and other metallic components may be used.

The hydrotreating reaction conditions are typically the mildest as compared to hydrocracking or hydrorefining and include the reduction of sulfur and nitrogen compounds present within the feed stock. Typically, the feed stocks fed to a hydrotreating reaction zone are relatively clean and possess lower molecular weights as compared to the feed stocks passed to hydrorefining reaction zones. They contain quantitites of sulfur and nitrogen which can be easily removed from the process feed stock. The preferred catalyst temperature within the hydrotreating reaction zone include temperatures of from about 550 to about 800° F. and pressures from about 300 to about 1500 p.s.i.g. Hydrogen is passed along with the feed stock into the hydrotreating reaction zone anywhere from a few s.c.f./bbl. of feed stock up to about 1500 s.c.f./bbl. or more of feed stock. Hydrogenation catalyst which may be used include nickel, platinum, copper, molybdenum, palladium, etc., compounds of the above metals including their oxides and sulfides, and any combination thereof. The catalyst may be used alone or composited with other materials including silica, alumina, magnesia, zirconia, thoria, zinc oxide, kieselguhr, diatomaceous earth, etc., or any combination thereof. The catalyst used in condition of operation in the treating zone will depend upon the charge stock characteristics of the treatment effected.

Other processes which can be utilized under the term "conversion processes" used in the claims and are relative of the well known in the art include both paraffin and aromatic isomerization processes, aromatic and paraffin alkylation processes, dehydrogenation, cracking and the production of methane rich gases from naphtha and steam.

Feed stocks which can be used for the conversion process of this invention can include any type of a hydrocarbon feed stock which is desired to be converted by a particular process using a particular catalyst. In particular, hydrotreating feed stocks can include naphthas, distillates, lube stocks or even residuals while the hydrorefining feed stocks generally include heavier materials such as heavy gas oils, heavy fuels, catalytic cracker feed stocks, and residual hydrocarbons from hydrovisc breaking operations. Hydrocracking feed stocks can include substances such as platforming feed stocks, lubricating oil materials, naphthas, or in some instances aromatic rich feed stocks. Typical feed stocks for hydrorefining include the heavy oils such as petroleum crude oils, atmospheric tower bottoms product, vacuum tower bottoms product, crude oil residues, top and/or reduced crude oils, coal oil extracts, crude oils extracted from tar sands, etc., all of which are commonly referred to in the art as black oils being characterized as heavy hydrocarbon materials having more than about 10% by volume boiling above a temperature of about 1050° F., having a gravity of less than about 20° API at 60° F., sulfur concentrations are high most often greater than about 2 wt. percent and may range as high as 5 wt. percent. Conradson carbon residue factors exceed roughly 1 wt. percent and may end up being higher than about 10. These materials generally contain high metal contents typically more of than about 150 p.p.m. and nitrogen concentrations by way of more than about 500 in many instances up to 5000 or more p.p.m. nitrogen by weight.

The hydrocracking feed stock typically include lighter weight materials in the black oils and typically contain around 1.5 wt. percent sulfur, 800 p.p.m. total nitrogen with an API of about 28 or higher degrees at 60° F. The endpoint of these feed stocks is typically below 1000° F. The hydrotreating feed stocks typically are the lighter weight naphtha or distillate materials such as gasoline boiling range naphtha or materials boiling in a range of from about 400 to about 750° F. or higher. Typical listings of naphthas include mid-continent straight run naphtha, Oklahoma straight run naphtha, California straight run naphtha, Kuwait straight run naphtha, Santa Maria coker distillate, Oklahoma cracked naphtha, and California cracked naphtha.

Carbon burn-off or regeneration conditions include operations in which the carbonaceous material present on the catalyst which is withdrawn from the final reactor is contacted with an oxygen-containing gas at sufficient temperature and oxygen concentration to allow substantially all of the carbonaceous materials to be removed from the catalyst. Additionally, carbon burn-off conditions include the oxidation of sulfur and in some instances nitrogen compounds along with the removal of metal materials from the catalyst. Specifically, carbon burn-off conditions can be varied depending upon catalyst used and the type of contaminant material present upon the catalyst prior to its regeneration. It is preferred in most instances when relatively large concentrations of carbonaceous material are present on the catalyst—that is, greater than about 1 wt. percent carbonaceous material on the catalyst, to cause the carbon burn-off to occur with an oxygen-containing gas stream which contains a relatively low concentration of oxygen. Preferably, the oxygen content can be regulated through the use of inert gases or the recycling of flue gas materials to maintain an initial oxygen level in the gases which contact the highly carbonaceous containing catalyst of from about 0.5 to about 2 vol. percent. By using the small concentration of oxygen, it is possible to reasonably control the oxidation of carbonaceous materials upon the catalyst without allowing excessively high temperatures to occur and preventing the possibility of runaway regeneration conditions within the carbon burn-off regenerating section.

A preferred mode of operating the carbon burn-off conditions within a regenerator include the countercurrent contacting of spent catalyst with air and an intermediate recycle stream comprising air and some recycled flue gas. Specifically, the catalyst which contains the largest quantity of carbonaceous material will enter the regenerator at a top portion thereof and continues in a downward direction as the dense bed through the regenerator and is eventually passed out of the regenerator at the bottom most portion thereof. Air or a high oxygen content gas stream passes into the bottom portion of the regenerator and contacts catalyst which contains a small quantity of carbonaceous material as compared to the quantity of carbonaceous material on the catalyst passed into the regenerator at the top portion thereof. As the gas passes in an upward direction in a dense phase bed of catalyst, it is reduced in oxygen content because of oxygen consumption. At some intermediate portion of the dense-phase bed of spent catalyst, the oxygen content is sufficiently reduced so that when that gas stream contacts the highly carbonaceous catalyst material relatively controlled carbon burn-off can take place. It is preferred that the recycle flue gas be mixed with the oxygen-containing gas which passes into the bottom of the regeneration zone at a point somewhere between the bottom and the catalyst entrance into the regeneration zone. Preferably, a portion or all of the flue gases may be recycled to maintain a maximum oxygen concentration of a few percent in the area within the regeneration zone where the high carbonaceous containing spent catalyst is present.

Carbon burn-off temperatures include initiation temperatures of about 500° F. with maximum flue gas outlet temperatures generally not to exceed about 1000° F. The catalyst in many instances is desired to be maintained below about 1000° F. in order to prevent thermal damage to the carrier material or excessive migration and agglomeration of metallic particles upon the carrier material. The length of time that the catalyst can contact the oxygen-containing gas stream can vary depending upon the desired maximum catalyst temperature which is desired and the quantity of catalyst passed into a given size regeneration zone. Typically, the regeneration can take place at a gas hourly space velocity of fresh gas of anywhere from about a few hundred to about 10,000 or greater. In the case where flue gas is recycled to the regeneration zone, it is preferred to scrub at least a portion or all of the flue gas recycled to remove unwanted contaminants such as sulfur oxides.

Both the fresh regeneration gas and recycle flue gas, if utilized, may be preheated to initiate the oxidation reaction within the regeneration zone. Also it is contemplated that the regeneration zone itself may have means connected to it to maintain catalyst temperatures within that zone at temperatures sufficient to induce the initiation of the carbon burn-off reactions. Typically, the preheat temperatures of gases when they are preheated vary anywhere from 300 to 500° F. or higher. The initial regeneration gas passed into the bottom of the regeneration zone when it is preheated may also be utilized to partially dry the catalyst in the bottom portion of the regeneration zone to remove any adsorbed water should that be present upon the catalyst.

To implement regeneration conditions, it is preferred that the catalyst being regenerated pass in a downward direction with regeneration gas flow generally in an upward direction. Preferably, the regeneration zone is constructed so that a column of spent catalyst is contacted with regeneration gas, with the gas entering the column internally and passing into a collection zone surrounding the column of catalyst. Even more preferably, the construction shown in the attached drawing can be utilized to effect regeneration of the catalyst.

Preferably, the regeneration of catalyst is essentially continuous with the catalyst flow rates through the reactor and regenerator generally equal. In this manner there is no accumulation of spent or regenerated catalyst. In other instances, regeneration may take place periodically. Then the spent catalyst will be allowed to accumulate after which it will then be regenerated and either passed directly into the reactor or accumulated and passed into the reactor at an appropriate time.

After the catalyst has been fully regenerated to a predetermined carbonaceous level, preferably less than a few tenths of a weight percent of coke, it is desired to pass the catalyst into the aforementioned confined reducing and sulfiding zones in the top portion of the reactor. In order to prevent danger of explosion by contacting the reducing and sulfiding zone with oxygen gases, it is desired to purge the catalyst removed from the regeneration zone with an inert gas. In any case, the catalyst which enters the confined reducing zone contains substantially no free oxygen but the metallic components present upon the catalyst are generally in an oxidized state. In instances in which reduction is desired, the temperature of the catalyst and/or the reducing gas streams in the reducing zone within the reactor, are high enough to initiate the reducing reaction. Preferably, reduction can take place at temperatures in excess of about 350° F. and preferably above about 500° F. In some instances both catalyst and the reducing gas are desired to be at temperatures within the range of from about 500° F. to about 900° F. to help initiate both the reduction and the sulfiding reaction and to allow the catalyst to pass into the reaction zone to be contacted with the reactant mixture feed stock at a temperature reasonably close to the temperature within the reaction zone.

The sulfiding reaction can take place within the confined sulfiding zone as described above and preferably at a temperature roughly equivalent to the temperature at which reduction takes place since the catalyst in the reduction and sulfiding zones is essentially a continuous dense bed. Temperature gradients across that bed, other than those caused by the heat of reactions of reducing and sulfiding, are not necessarily desired. The sulfiding agent typically used is either gaseous $H_2S$ or $H_2S$ diluted in gaseous hydrocarbons or dissolved in a liquid hydrocarbon. Other sulfiding agents include sulfur compounds such as alkylmercaptans or alkyl sulfides or any other hydrocarbon compounds combined with sulfur which can upon contact with a metal within the catalyst, sulfide the metal and itself be broken down. Typical sulfiding operations include temperatures in the range of from about 300 to about 500° F. and typically from about 500 to about 900° F. The pressures typically can vary anywhere from a few pounds up to 5000 or more p.s.i.g. and in this process are typically limited to the pressure at which the conversion process is operated.

Typically in sulfiding operations in which a liquid hydrocarbon is utilized to sulfide, it is preferred to prewet the catalyst in a slow manner so that heat of adsorption liberated by the adsorption of liquid hydrocarbons can be dissipated. Typically, sulfiding operations can be anywhere from a few minutes to many days depending upon the temperature at which the catalyst and sulfiding agent are introduced into the sulfiding zone, the concentration of the sulfiding agent and the quantity of metals present upon the catalyst. Sulfiding conditions are carried out so that substantially all of the desired metals upon the catalyst are sulfided.

After both the reducing and sulfiding operations have taken place, the catalyst is then passed into the top bed portion of the dense-phase bed of catalyst maintained in the upper recation zone. The catalyst is passed into the reaction zone along with hydrogen, unreacted sulfiding agent and the products of reduction and sulfiding. In instances in which the feed stocks of the process utilized contain contaminants themselves such as oxygen sulfur or nitrogen compounds or metal contaminants, the introduction of excess sulfiding agent and reducing agent and the products of reducing and sulfiding reactions along with the catalyst into the reaction zone does not present difficulty and will not reduce to a significant degree the quality of the products produced from the process or damage the activity of the catalyst in any manner.

The effluent recovered from the reaction zone can be used in any other process. The gaseous materials from the effluent can preferably be sent to the separation zone in which hydrogen rich gaseous components can be used for hydrogen consuming processes with a portion or all of the hydrogen recycled back to the reaction zone and admixture with the feed stock when hydrogen is desired to be present within the conversion process. Make-up hydrogen can be utilized especially in hydrogen consumption processes.

The length of time that the catalyst shall take to completely pass through the reaction zone can be any period depending upon the type of conversion process, the processing conditions, the degree of catalyst deactivation and the quantity of feed stock passed through the reaction zone. Preferably the catalyst can be turned over in a period of about a few weeks but in some instances in which large quantities of feed and small volume of catalyst is utilized, the complete turnover of the catalyst may occur in less than a day or a few hours. In other instances in which either the catalyst quantity used is large enough or the feed rate is small enough or the degree of deactivation of the catalyst is slight, it is possible to completely turn over the catalyst in the reaction zone in a period in excess of a month.

When referring to a moving bed of catalyst particles we mean an average turnover of the catalyst in the reaction zone. The catalyst may be continuously moving in cases in which catalyst is continuously added and continuously withdrawn from the reactions or the catalyst may be added in intermittent cycles. For instance, every half hour a few hundred pounds of catalyst may be added to a reactor while at the same time an identical quantity of catalyst is removed from the reaction. It can be seen then that the term "moving bed" does include those instances in which the bed is shifted in a cyclic manner and not necessarily continuously being moved throughout the reaction zone.

The catalyst particles to be used in the process of this invention are typically greater than about $\frac{1}{16}''$ diameter. In order to prevent catalyst packing and unequal fluid and catalyst distribution throughout the system, it is preferred that the catalyst particles be relatively spherical in shape and possess diameters of at least about $\frac{1}{32}''$ or greater. In some instances the catalyst particle diameters may be smaller, but it is desired that the catalyst be larger in diameter than catalyst used in fluidized processing. Specifically, $\frac{1}{32}''$ catalyst particle spheres made of alumina and/or silica and/or silica-alumina impregnated with catalytic metals can be used as catalyst. Extruded or pilled particles may also be used as long as they will pass freely through the recators.

The preferred reaction zone catalyst placement is as shown in the drawing—annular placement. This is the desired arrangement when the catalyst flow is downward and it is desired that interstage heating or cooling take place. In some instances the catalyst may be used in the form of a cylindrical bed with addition of catalyst at the top and removal at the bottom. In this case, the feed would enter the catalyst at the top of the bed and exit the bed at its bottom.

The radial flow reactor arrangement shown in the drawing seem to be the best design where the catalyst flow down through the reactor will not be inhibited by fusing together of large masses of catalyst particles. The advantages offered by the radial flow reactor design are that good flow distribution can be achieved and the possibility of local dead spots in the catalyst bed can be eliminated.

Located within the reactor arrangements may be various input streams containing purge or quench input streams. They are preferably hydrogen or steam or other gaseous or liquid material which can pass into the reaction zone at some location within it to reduce the temperature of the reaction and thereby control the reaction rate at this point. Preferably, quench streams are utilized in exothermic reaction zones in which it is desired to prevent a high temperature from occuring within the bed above a certain preset temperature.

We claim as our invention:

1. A method of operating a continuous hydrocarbon conversion process employing solid catalyst particles which method comprises:
   (a) charging a hydrocarbon reaction mixture to a reactor and contacting said reactant mixture with a dense-phase moving bed of catalyst particles at hydrocarbon conversion conditions;
   (b) withdrawing used catalyst particles containing carbonaceous deposits thereon from said reactor while maintaining the same on stream at said conversion conditions;
   (c) treating the used catalyst particles with an oxygen-containing gas at regeneration conditions to burn at least a portion of carbonaceous matter therefrom;
   (d) charging the regenerated catalyst particles together with hydrogen to the top of said reactor and processing the catalyst particles downwardly as a dense-phase moving bed in contact with said hydrogen through a confined reducing zone in the upper portion of said reactor whereby said particles are reduced at a temperature above about 300° F.;
   (e) processing the reduced catalyst particles downwardly as a dense-phase moving bed in contact with said hydrogen to a confined sulfiding zone in open communication with said reducing zone;
   (f) continuously introducing and comingling a sulfiding agent with catalyst particles and hydrogen in said sulfiding zone at conditions to effect sulfiding of desired metals upon the catalyst; and,
   (g) the resulting reduced and sulfided particles being processed downwardly from said sulfiding zone together with products of reduction and sulfiding and unreacted hydrogen and sulfiding agent into said reactor.

2. The method of Claim 1 in that said conversion conditions include hydrotreating conditions and in which hydrogen is passed into said reactor comingled with said reaction mixture.

3. The method of Claim 1 in that said conversion conditions include hydrocracking conditions.

4. The method of Claim 1 in that said sulfiding agent comprises hydrogen sulfide.

5. The method of Claim 1 in that said sulfiding agent comprises a hydrocarbon chemically combined with sulfur.

6. The method of Claim 5 in that said sulfiding agent is diluted with a liquid hydrocarbon carrier material.

7. The method of Claim 6 in that said carrier material is reaction mixture material.

8. A method of operating a continuous hydrocarbon conversion process employing solid catalyst particles which process comprises:
   (a) charging a hydrocarbon reaction mixture to an initial reactor of a multiple reactor system comprising moving bed reactors connected in series and contacting said reaction mixture with a dense-phase moving bed of catalyst at hydrocarbon conversion conditions;
   (b) withdrawing catalyst particles from said initial reactor and passing the particles through said multiple reactor system in series flow with used catalyst particles containing carbonaceous deposits thereon being recovered from a final reactor in the reactor train, all reactors remaining on stream at said conversion conditions;
   (c) treating the used catalyst particles with an oxygen-containing gas at regeneration conditions to burn at least a portion of the carbonaceous matter therefrom;
   (d) charging the regenerated catalyst particles together with hydrogen to the top of said intial reactor and processing the catalyst particles downwardly as a dense-phase moving bed in contact with said hydrogen through a confined reducing zone within the upper portion of said initial reactor at reduction conditions whereby said particles are reduced at a temperature above about 300° F.;
   (e) processing the reduced catalyst particles downwardly as a dense-phase moving bed in contact with said hydrogen to a confined sulfiding zone in open communication with said reducing zone.
   (f) continuously introducing and comingling a sulfiding agent with the catalyst particles and hydrogen in said sulfiding zone under conditions to effect the sulfiding of desired metals upon the catalyst; and,
   (g) the resulting reduced and sulfided catalyst particles being processed downwardly from said sulfiding zone together with said products of reduction and sulfiding and unreacted hydrogen and sulfiding agent to a dense-phase moving bed catalyst bed in said initial reactor of said multiple reactor system.

9. The method of Claim 8 in that said sulfiding agent comprises hydrogen sulfide.

10. The method of Claim 8 in that said sulfiding agent comprises a hydrocarbon chemically combined with sulfur.

11. The method of Claim 10 in that said sulfiding agent is diluted with a liquid hydrocarbon carrier material.

12. The method of Claim 11 in that said carrier material is reaction mixture material.

13. A method of operating a continuous hydrocarbon conversion process employing solid catalyst particles which process comprises:
   (a) preheating a hydrocarbon reaction mixture to a hydrocarbon conversion temperature, charging the heated reaction mixture to a reactor and contacting said reactant mixture with a dense-phase moving bed of catalyst of particles at hydrocarbon conversion conditions;
   (b) withdrawing used catalyst particles containing carbonaceous deposits thereon from said reactor while maintaining the same on stream at said conversion conditions;
   (c) treating the used catalyst particles at regeneration conditions with an oxygen-containing gas to burn at least a portion of the carbonaceous matter therefrom;
   (d) charging the regenerated catalyst particles together with hydrogen to the top of said reactor and processing the catalyst particles downwardly as a dense-phase moving bed in contact with said hydrogen through a confined reducing and sulfiding zone located in the upper portion of said reaction zone to effect an indirect heat exchange relationship with the hot reaction mixture charged to said reactor whereby said particles are reduced at reducing conditions at a temperature above about 300° F.;
   (e) processing the reduced catalyst particles downwardly as a dense-phase moving bed in contact with said hydrogen to a confined sulfiding zone in open communication with said reducing zone;
   (f) continuously introducing and comingling a sulfiding agent with the hot catalyst particles and hydrogen in said sulfiding zone at sulfiding conditions to effect the sulfiding of preferred metals upon the catalyst; and,
   (g) the resulting reduced and sulfided particles being processed downwardly from the sulfiding zone together with products of reduction and sulfiding and unreacted hydrogen and sulfiding agent to a dense-phase moving bed of catalyst particles within said reactor and contacting said reaction mixture at said conversion conditions to effect conversion of said reaction mixture to desired products.

14. The method of Claim 13 in that said reaction mixture includes molecular hydrogen and said conversion includes hydrocracking at from about 100 to about 3000 pounds per square inch pressure, average catalyst bed temperatures from about 500 to about 1000° F., reduction in the molecular size of the charge stock of approximately greater than 40% and hydrogen consumption in excess of 500 s.c.f./bbl. of feed processed.

15. The method of Claim 13 in that said reaction mixture contains molecular hydrogen and said conversion comprises hydrotreating processing at pressures from about 100 to about 1000 p.s.i.g., average catalyst bed temperatures from about 500 to about 900° F., hydrogen consumption of less than about 300 s.c.f./bbl., with less than 15% reduction in the molecular size of feed molecules.

16. The method of Claim 13 in that said regeneration conditions include an average oxygen concentration of from about 0.5 to about 2 vol. percent of regeneration gas contacting said catalyst particle.

References Cited

UNITED STATES PATENTS

| | | | |
|---|---|---|---|
| 2,411,996 | 12/1946 | Kassel | 252—418 |
| 2,835,629 | 5/1958 | Berg | 252—418 |
| 2,879,225 | 3/1959 | Oliver et al. | 252—418 |
| 3,162,595 | 12/1964 | Szepe | 252—416 |
| 3,434,965 | 3/1969 | Jaffe | 252—416 |
| 3,586,620 | 6/1971 | Conner | 208—111 |
| 3,725,248 | 4/1973 | Greenwood et al. | 208—165 |
| 3,725,249 | 4/1973 | Vesely et al. | 208—139 |
| 3,647,680 | 3/1972 | Greenwood et al. | 208—138 |

DELBERT E. GANTZ, Primary Examiner

J. W. HELLWEGE, Assistant Examiner

U.S. Cl. X.R.

208—59, 165, 304; 252—418; 23—288 G